United States Patent Office 3,598,758
Patented Aug. 10, 1971

3,598,758
CATALYST COMPOSITION AND PROCESS FOR OXYCHLORINATING HYDROCARBONS
Shunichi Koyanagi, Kinya Ogawa, and Fumio Akiya, Niigata-ken, Japan, assignors to Shin-Etsu Chemical Co., Ltd., Tokyo, Japan
No Drawing. Filed May 21, 1968, Ser. No. 730,927
Claims priority, application Japan, May 23, 1967, 42/32,745
Int. Cl. C07c 17/10
U.S. Cl. 252—429        9 Claims

ABSTRACT OF THE DISCLOSURE

Catalyst suitable for the oxychlorination of aliphatic hydrocarbons. The catalyst has superior thermal stability, exhibits long lasting activity and essentially consists of three ingredients in defined proportions, namely of a mixture of an organic copper compound, an alkali metal chloride and an ammonium salt, deposited on a porous carrier.

A method for depositing the three ingredients on the porous carrier is also part of the invention.

SUMMARY OF THE INVENTION

This invention generally relates to catalysts and is more particularly directed to a novel catalyst composition suitable for the oxychlorination of aliphatic hydrocarbons, and to a method for preparing the new catalyst composition.

Considered from another aspect, the invention provides for an improved process for oxychlorinating aliphatic hydrocarbons with the novel catalyst composition.

Various catalyst compositions have previously been suggested for the oxychlorination of aliphatic hydrocarbons. U.S. Pat. 3,184,515 thus teaches the use of a catalyst which contains $CuCl_2$ as the main constituent. In U.S. Pat. No. 2,308,489, catalyst compositions are disclosed which are prepared by first depositing organic metal compounds on carriers, whereafter the metal compounds are decomposed into the corresponding metals or oxides. It has also been attempted to use catalysts which are prepared by depositing cupric formate. These known catalyst compositions have, however, the common disadvantage that the catalytic activity is gradually reduced at the high temperatures customarily required for the chlorination, to wit, temperatures in excess of 250° C. To overcome this disadvantage, it has been suggested to use cupric chloride as the main constituent of the catalyst, but in conjunction with the chlorides of alkali metals, selenium, ytterbium, thorium, uranium and didymium or with bisulfates such as $NaHSO_4$. However, even if such latter catalyst compositions are used, the reaction temperature during the chlorination must be kept as high as about 200 to 300° C., resulting in the occurrence of undesired side reactions. This, in turn, reduces the yield rates of the chlorinated hydrocarbons, to wit, the desired end products. Complicated refining processes are therefore necessary which make the use of prior art catalyst compositions uneconomical. It must also be considered that cupric chloride has a tendency to volatilize at the reaction temperatures required for the chlorination and the gaseous cupric chloride in combination with hydrogen chloride and water exerts a significant corrosive action on the reaction apparatus.

U.S. Pat. No. 3,010,913 discloses that the HCl conversion may be increased to above 90% at relatively low temperatures of between about 180 and 250° C., provided the catalyst employed in the reaction is prepared by depositing, on porous carriers, a mixture which contains cupric chloride as its main constituent, the cupric chloride being dissolved in an alkyl alcohol of from 1 to 8 carbon atoms. Oxychlorination processes carried out with such catalyst composition, however, do not result in high yields of chlorinated aliphatic hydrocarbons, to wit, the desired end products. Consequently, cumbersome and complicated refining processes are subsequently necessary and the use of the indicated catalyst composition at the relatively low temperatures is thus not economically sound.

It is a primary object of the present invention to overcome the drawbacks and disadvantages of the prior art catalyst compositions and to provide a novel catalyst composition suitable for the oxychlorination of aliphatic hydrocarbons which has a superior thermal stability and whose catalytic activity lasts for a prolonged period of time.

It is also an object of this invention to provide a catalyst composition of the indicated nature which enables the oxychlorination of aliphatic hydrocarbons at high yield and at low reaction temperatures and in the absence of undesired side reactions.

Still another object of the invention is to provide a simple method for preparing the novel catalyst composition.

Considered from another aspect, it is an object of the invention to provide for an improved process for preparing chlorinated aliphatic hydrocarbons in the presence of the inventive catalyst compositions.

It is also an object of the invention to provide an improved oxychlorination process for aliphatic hydrocarbons which does not require complicated refining processes and which can be carried out without the danger of corrosion to the reaction apparatus.

Generally, it is an object of the invention to improve on the art of oxychlorinating aliphatic hydrocarbons as presently practiced.

Briefly, and in accordance with this invention, the novel catalyst composition essentially comprises a porous carrier which has incorporated therein a mixture of an organic copper compound, an alkali metal chloride and an ammonium compound. The organic copper compound, the alkali metal chloride and the ammonium compound are deposited on the porous carrier.

The oxychlorination of aliphatic hydrocarbons is carried out in accordance with the invention in the vapor phase, by passing the aliphatic hydrocarbons over the novel catalyst composition in the presence of an oxygen-containing gas and hydrogen chloride.

The novel catalyst composition comprising the three above-mentioned ingredients, to wit, (1) an organic copper compound, (2) an alkali metal chloride and (3) an ammonium compound exhibits superior catalytic activity even at comparatively low temperatures, so that the oxychlorination of the aliphatic hydrocarbons can be carried out at lower temperatures than has previously been possible.

A variety of organic copper compounds may be used for the inventive purposes. Excellent results are obtained with fatty acid copper salts in which the fatty acid moiety has at the most 8 carbon atoms. Cupric formate, cupric citrate, cupric acetate, cupric aminoacetate, cupric butyrate, cupric lactate, cupric oxalate and cupric tartrate are examples of suitable organic copper compounds. Mixtures of two or more organic copper compounds may also successfully be used for the inventive purpose.

In respect to the alkali metal chlorides, potassium chloride and sodium chloride have proved to be eminently suitable.

With regard to the ammonium compounds, an ammonium salt of an inorganic acid, such as, for example, ammonium bicarbonate, ammonium bisulfate, ammonium bisulfite, ammonium sulfate, ammonium sulfite, ammonium nitrate, ammonium chloride, and ammonium iodide yield excellent results.

A mixture of the three components 1, 2 and 3 is deposited on a suitable porous substance which acts as the carrier. Activated alumina, active charcoal, silica gel, brick, pumice and diatomaceous earth are thus suitable carriers in the oxychlorination reaction.

The mixing ratio of the components is important with a view to obtaining an optimum effect. Tests have indicated that the molar ratio of organic copper compound to alkali metal chloride should be about between 1:20 and 20:1 and preferably between 1:10 and 10:1. The molar ratio of organic copper compound to ammonium compound should preferably be between 1:20 and 20:1 and still better between 1:10 and 10:1.

The concentration of the mixture deposited on the porous substance or carrier is also of importance and should be from aebout 0.5 to 35% by weight of copper compound calculated on 100% by weight of the porous carrier. Non-adherence to the indicated mixing ratios results in reduced effects so that the procedure then is no longer economical. For example, if the concentration of the copper compound in the mixture deposited on the porous carrier is below 0.5% by weight, the reaction rate will be too low to yield any satisfactory industrial advantage. By contrast, if the copper content is above 35% by weight, the surface area of the porous carrier will become too small which, in turn, causes a significant reduction in the catalytic activity.

The three components 1, 2 and 3, are advantageously deposited on the porous carrier in the form of an aqueous solution. The components are thus dissolved in water and the porous carrier is dipped into the aqueous solution, removed therefrom and subsequently subjected to drying. The solution can also be sprayed on to the carrier. The drying is preferably carried out at elevated temperatures for example, at a temperature of about 105° C. for 1 to 5 hours. The thus dried porous carrier enriched with the three components is then calcined in an air current for 10 to 48 hours at 200 to 500° C. It should be pointed out, however, that the three components may be dissolved in a different solvent. The water may thus be replaced by a suitable organic solvent such as alcohol, for example, ethyl alcohol. In some instances, it may be of advantage to mix or blend the porous carrier with the three components in dry state, the latter being provided in powder form. In this manner, the use of any solvent is avoided and a homogeneous mixture of porous substance and active components is formed which may then be slightly compacted into a self-sustaining body. The catalyst compositions prepared in accordance with this invention possess high catalytic activity and extreme stability, particularly thermal stability.

For the purpose of oxychlorinating aliphatic hydrocarbons in accordance with the present invention, the aliphatic hydrocarbons, hydrogen chloride and oxygen or an oxygen-containing gas, such as air, are passed in mixture over the inventive catalyst composition. When the hydrocarbon is of olefinic nature, the reaction temperature should preferably be in the range of from 150 to 280° C. The preferred temperature range is from 150 to 200° C. This is so because if the temperature is below 150° C., the reaction rate will be too low to be of economic interest. By contrast, if the temperature is very high, to wit, above 280° C., then undesired byproducts may be formed. For example, in the oxychlorination of ethylene, byproducts such as methyl chloride, cis- and trans-1,2 dichloroethylene, 1,1,2 trichloroethane, 1,1,2,2 tetrachloroethane, and trichloroethylene may be produced. This, in turn, lowers the selectivity of 1,2 dichloroethane, i.e. the desired end product.

A suitable mixing ratio of the gases—olefinic hydrocarbon:hydrogen chloride:oxygen—to be passed over the catalyst is 1:0.5-3:0.1-1.2 by volume. The preferred contact time should be from 0.1 to 30 seconds. The reaction may be carried out under any suitable pressure conditions.

The inventive catalyst may also advantageously be employed in the oxychlorination of paraffinic hydrocarbons. In that case, however, the reaction temperature should be higher, to wit, it should be in the range of from 250 to 450° C. In respect to the mixing ratio of the gases to be passed over the catalyst, the ratio of hydrogen chloride to hydrocarbons may be either increased or decreased in accordance with the kind of chlorides which are desired as the end products. As a general proposition, however, it is preferred that the volume of oxygen be larger than that of hydrogen chloride.

Whether the hydrocarbons employed as the starting material are of olefinic or paraffinic nature, the catalyst has the greatest effect if the hydrocarbons contain less than 4 carbon atoms per molecule.

The invention will now be described by several examples, it being understood, however, that these examples are given by way of illustration and not by way of limitation and that many changes may be effected without affecting in any way the scope and spirit of the invention as recited in the appended claims.

In the examples, "HCl conversion" means the rate of hydrogen chloride consumed to hydrogen chloride supplied and "EDC selectivity" is the mole percent of 1,2-dichloroethane to chlorinated hydrocarbons prepared by the reaction.

EXAMPLES 1–4

Four different catalysts, 1, 2, 3 and 4 were prepared. The preparation of each catalyst was effected by depositing the respective catalytic composition indicated in Table 1 on 100 g. of activated alumina. The catalytic compositions were supplied in an aqueous solution and poured or sprayed onto the activated alumina and the thus enriched activated alumina was thereafter subjected to preparatory drying and subsequently to calcining at 350° C. while air was passed over the alumina. Each of the catalysts thus prepared was placed in a reaction tube and maintained at a temperature of 180° C. A mixture of ethylene, hydrogen chloride and air in a volume ratio of 1:2:5 and at a space velocity of 495 Nl./l. cat. hr. was passed over the catalyst. For control purposes, the same reaction was carried out with catalysts consisting of $CuCl_2$, $Cu(HCOO)_2$, $CuCl_2$—KCl and

The results obtained are indicated in Table 1.

TABLE 1

| Composition of catalysts | Example | | | | Control | | | |
|---|---|---|---|---|---|---|---|---|
| | 1 | 2 | 3 | 4 | 1 | 2 | 3 | 4 |
| $Cu(HCOO)_2$ (mole) | 0.1 | | | 0.1 | | 0.1 | | |
| $Cu(CH_3COO)_2$ (mole) | | 0.1 | | | | | | |
| $CuCl_2$ (mole) | | | | | 0.1 | | 0.1 | 0.1 |
| $Cu_2(C_6H_4O_7) \cdot 5/2H_2O$ (mole) | | | 0.1 | | | | | |
| NaCl (mole) | | | | | 0.05 | | | |
| KCl (mole) | 0.05 | 0.05 | 0.5 | | | | 0.1 | |
| $NaHSO_4$ | | | | | | | | 0.05 |
| $NH_4Cl$ (mole) | 0.05 | 0.05 | | | | | | |
| $NH_4HCO_3$ (mole) | | | | 0.05 | | | | |
| $NH_4HSO_4$ (mole) | | | 0.05 | | | | | 0.05 |
| Activated alumina (g.) | 100 | 100 | 100 | 100 | 100 | 100 | 100 | 100 |
| HCl conversions, percent | 88.48 | 73.27 | 40.2 | 59.1 | 3.21 | 8.4 | 11.3 | 32.0 |
| EDC selectivities (mole percent) | 98.5 | 98.92 | 98.89 | 98.6 | 98.7 | 99.1 | 95.1 | 98.9 |

The same reactions as mentioned in Example 1 were carried out at the temperatures indicated in Table 2, for 50 hours consecutively. The results obtained showed the activity change rates tabulated in Table 2, demonstrating the excellent thermal stability of the catalysts of the present invention.

Catalyst activity change rate $$= \left(1 - \frac{\text{HCl conversion after 50 hrs.}}{\text{HCl conversion at the start}} \times 100\right)$$

TABLE 2

| | Catalyst of— | | | | | |
|---|---|---|---|---|---|---|
| | Example 1 | | | Control 1 | | |
| Reaction temperature (° C.) | 180 | 230 | 260 | 180 | 230 | 260 |
| Activity change rate, percent | 0 | 0.02 | 0.15 | 0.01 | 1.30 | 20.5 |

EXAMPLE 6

The catalyst indicated in Example 2 was placed in a reaction tube. A mixture of reaction gases consisting of propylene, hydrogen chloride and air in a volume ratio of 1.25:1:5 was passed over the catalyst at a space velocity of 505 Nl./l. cat. hr. The reaction was carried out at a temperature of 180° C. The HCl conversion was 79% and the reaction product upon analysis was found to consist of chlorides of the following composition:

| | Weight percent |
|---|---|
| n-Propyl chloride | 18.0 |
| 1,2-dichloropropane | 44.0 |
| 1,3-dichloropropane | 33.0 |
| Allyl chloride | 5.0 |

EXAMPLES 7–9

The catalysts prepared of the constituents shown in Table 3 were each placed in a reaction tube. At the space velocity indicated in Table 3, mixture of reaction gases consisting of ethylene, hydrogen chloride and air in the volume ratio of 1:2:5 was passed over the catalysts. The reaction was carried out at a temperature of 180° C. The results obtained are indicated in Table 3.

TABLE 3

| | Example | | |
|---|---|---|---|
| Composition of Catalysts | 7 | 8 | 9 |
| Cupric formate (mole) | 0.2 | | 0.05 |
| Cupric acetate (mole) | | 0.2 | |
| KCl (mole) | 0.1 | 0.2 | 0.05 |
| NH₄Cl (mole) | 0.2 | | 0.03 |
| NH₄HSO₄ (mole) | | 0.1 | |
| Activated alumina (g.) | 100 | 100 | 100 |
| Space velocity (Nl./l. cat. hr.) | 500 | 500 | 450 |
| HCl conversions, (percent) | 62.0 | 64.0 | 46.8 |
| EDC selectivities (mole percent) | 98.6 | 98.6 | 98.4 |

EXAMPLE 10

The catalyst indicated in Example 1 was placed in a reaction tube. The mixture of reaction gases consisting of methane, hydrogen chloride and air in a volume ratio of 1:2:5.5 was passed over the catalyst at a space velocity of 395 Nl./l. cat. hr. The reaction was carried out at a temperature of 400° C. The HCl conversion was 95% and the chloromethanes obtained, upon analysis, proved to have the following composition:

| | Weight percent |
|---|---|
| Monochloromethane | 13.2 |
| Dichloromethane | 40.5 |
| Trichloromethane | 30.1 |
| Tetrachloromethane | 16.2 |

EXAMPLE 11

The catalyst indicated in Example 1 was placed in a reaction tube. A mixture of ethane, hydrogen chloride and air in a volume ratio of 1:2:5.5 was passed over the catalyst at a space velocity of 640 Nl./l. cat. hr. The reaction was carried out at a temperature of 300° C. The HCl conversion was 71% and the chloroethanes obtained had the following composition:

| | Weight percent |
|---|---|
| Vinyl chloride | 4.0 |
| Monochloroethane | 23.1 |
| Vinylidene chloride | 13.0 |
| 1,1-dichloroethane | 24.3 |
| 1,2-dichloroethane | 24.0 |
| 1,1,1-trichloroethane | 8.0 |
| 1,1,2-trichloroethane | 3.6 |

While specific embodiments of the invention have been shown and described in detail to illustrate the application of the inventive principles, it will be understood that the invention may be embodied otherwise without departing from such principles.

What is claimed is:

1. A method of preparing a precursor for a catalyst composition suitable for the oxychlorination of aliphatic hydrocarbons which comprises depositing on a porous carrier a mixture essentially consisting of a
   (a) a cupric salt of a fatty acid being selected from the group consisting of cupric formate, cupric acetate, and cupric citrate,
   (b) an alkali metal chloride being selected from the group consisting of potassium chloride and sodium chloride, and
   (c) an ammonium salt of an inorganic acid being selected from the group consisting of ammonium bicarbonate, ammonium bisulfate, and ammonium chloride, the molar ratio of said cupric salt to said alkali metal chloride being between about 2:1 and 1:5, the molar ratio of said cupric salt to said ammonium salt being between about 1:1 and 2:1 and the concentration of said cupric salt being about 0.5% to 35% by weight calculated on said porous carrier.

2. The method as claimed in claim 1, wherein said porous carrier is mixed with said components a, b, and c in dry state, all being provided in powder form, and then being slightly compacted into a selfsustaining body.

3. A method of preparing a catalyst composition suitable for the oxychlorination of aliphatic hydrocarbons which comprises depositing on a porous carrier a mixture essentially consisting of
   (a) a cupric salt of a fatty acid being selected from the group consisting of cupric formate, cupric acetate, and cupric citrate,
   (b) an alkali metal chloride being selected from the group consisting of potassium chloride and sodium chloride, and
   (c) an ammonium salt of an inorganic acid being selected from the group consisting of ammonium bicarbonate, ammonium bisulfate, and ammonium chloride, the molar ratio of said cupric salt to said alkali metal chloride being between about 2:1 and 1:5, the molar ratio of said cupric salt to said ammonium salt being between about 1:1 and 2:1 and the concentration of said cupric salt being about 0.5% to 35% by weight calculated on said porous carrier, said mixture being applied to said porous carrier in the form of an aqueous solution, whereafter the porous carrier enriched with the solution is dried at a temperature of about 105° C. for 1 to 5 hours, and then is calcined in an air current for 10 to 48 hours at 200 to 500° C.

4. A method of preparing a catalyst composition suitable for the oxychlorination of aliphatic hydrocarbons which comprises depositing on a porous carrier a mixture essentially consisting of
  (a) a cupric salt of a fatty acid being selected from the group consisting of cupric formate, cupric acetate, and cupric citrate,
  (b) an alkali metal chloride being selected from the group consisting of potassium chloride and sodium chloride, and
  (c) an ammonium salt of an inorganic acid being selected from the group consisting of ammonium bicarbonate, ammonium bisulfate, and ammonium chloride, the molar ratio of said cupric salt to said alkali metal chloride being between about 2:1 and 1:5, the molar ratio of said cupric salt to said ammonium salt being between about 1:1 and 2:1 and the concentration of said cupric salt being about 0.5% to 35% by weight calculated on said porous carrier, said mixture being applied to said porous carrier in the form of a solution in an organic solvent, whereafter said porous carrier enriched with the solution is dried, and then is calcined in an air current for 10 to 48 hours at 200 to 500° C.

5. A precursor for a catalyst composition suitable for the oxychlorination of aliphatic hydrocarbons essentially consisting of a porous carrier having incorporated therein a mixture of a cupric salt of a fatty acid having at most 8 carbon atoms, an alkali metal chloride, and an ammonium salt of an inorganic acid; wherein the molar ratio of said cupric salt to alkali metal chloride is between about 1:20 and 20:1, the molar ratio of said cupric salt to said ammonium salt is 1:20 and 20:1, and the concentration of said cupric salt is between about 0.5 and 30% by weight calculated on said porous carrier.

6. The precursor according to claim 5, wherein
  (a) the cupric salt of a fatty acid is selected from the group consisting of cupric formate, cupric citrate, cupric acetate, cupric aminoacetate, cupric butyrate, cupric lactate, cupric oxalate and cupric tartrate;
  (b) the alkali metal chloride is selected from the group consisting of potassium chloride and sodium chloride, and
  (c) the ammonium salt of an inorganic acid is selected from the group consisting of ammonium bicarbonate, ammonium bisulfate, ammonium bisulfite, ammonium sulfate, ammonium sulfite, ammonium nitrate, ammonium chloride and ammonium iodide, the concentration of said cupric salt being between about 0.5 and 35% by weight calculated on said porous carrier.

7. The precursor according to claim 6, wheren
  (a) the cupric salt of the fatty acid is selected from the group consisting of cupric formate, cupric acetate, and cupric citrate;
  (b) the alkali metal chloride is selected from the group consisting of potassium chloride and sodium chloride, and
  (c) the ammonium salt of an inorganic acid is selected from the group consisting of ammonium bicarbonate, ammonium bisulfate, and ammonium chloride.

8. The precursor as claimed in claim 7, wherein the molar ratio of said cupric salt to said alkali metal chloride is between about 2:1 and 1:5, and the molar ratio of said cupric salt to said ammonium salt is between about 1:1 and 2:1.

9. The precursor as claimed in claim 8, wherein said porous carrier is selected from the group consisting of activated alumina, active charcoal, silica gel, brick, pumice and diatomaceous earth.

References Cited
UNITED STATES PATENTS

| | | | |
|---|---|---|---|
| 2,442,285 | 5/1948 | Cheney | 260—652 |
| 2,206,399 | 7/1940 | Grosuenor | 23—219 |

DANIEL E. WYMAN, Primary Examiner

P. M. FRENCH, Assistant Examiner

U.S. Cl. X.R.

260—659; 252—441,438